(12) United States Patent
Harrison et al.

(10) Patent No.: US 8,707,303 B2
(45) Date of Patent: Apr. 22, 2014

(54) DYNAMIC VIRTUALIZATION AND POLICY-BASED ACCESS CONTROL OF REMOVABLE STORAGE DEVICES IN A VIRTUALIZED ENVIRONMENT

(75) Inventors: Keith Harrison, Chepstow (GB); Richard Brown, Bristol (GB); Chris I. Dalton, Bristol (GB)

(73) Assignee: Hewlett-Packard Development Company, L.P., Houston, TX (US)

( * ) Notice: Subject to any disclaimer, the term of this patent is extended or adjusted under 35 U.S.C. 154(b) by 206 days.

(21) Appl. No.: 13/259,527

(22) PCT Filed: Oct. 22, 2009

(86) PCT No.: PCT/US2009/061681
§ 371 (c)(1),
(2), (4) Date: Sep. 23, 2011

(87) PCT Pub. No.: WO2011/049574
PCT Pub. Date: Apr. 28, 2011

(65) Prior Publication Data
US 2012/0023494 A1   Jan. 26, 2012

(51) Int. Cl.
*G06F 9/455* (2006.01)
*G06F 17/30* (2006.01)
*H04L 29/06* (2006.01)

(52) U.S. Cl.
USPC ........................................ 718/1; 726/1; 726/2

(58) Field of Classification Search
None
See application file for complete search history.

(56) References Cited

U.S. PATENT DOCUMENTS

| | | | |
|---|---|---|---|
| 6,496,847 B1 | 12/2002 | Bugnion et al. | |
| 6,978,366 B1 * | 12/2005 | Ignatchenko et al. | 713/166 |
| 7,272,831 B2 | 9/2007 | Cota-Robles et al. | |
| 7,458,075 B2 | 11/2008 | Keys | |
| 7,555,596 B2 * | 6/2009 | Tolba | 711/112 |
| 7,591,019 B1 | 9/2009 | Sobko et al. | |
| 2005/0086511 A1 * | 4/2005 | Balacheff et al. | 713/200 |
| 2005/0216920 A1 * | 9/2005 | Tewari et al. | 719/324 |
| 2006/0288168 A1 * | 12/2006 | Stevenson | 711/115 |
| 2007/0074226 A1 | 3/2007 | Zimmer et al. | |
| 2007/0112772 A1 | 5/2007 | Morgan et al. | |
| 2007/0136606 A1 * | 6/2007 | Mizuno | 713/189 |
| 2007/0180449 A1 * | 8/2007 | Croft et al. | 718/1 |
| 2008/0091934 A1 * | 4/2008 | Peterson et al. | 713/2 |
| 2008/0127309 A1 | 5/2008 | Challener et al. | |
| 2008/0163208 A1 | 7/2008 | Burr et al. | |
| 2008/0209544 A1 * | 8/2008 | Kempka | 726/17 |
| 2008/0256536 A1 * | 10/2008 | Zhao et al. | 718/1 |
| 2008/0307409 A1 * | 12/2008 | Lu et al. | 717/174 |
| 2009/0044024 A1 * | 2/2009 | Oberheide et al. | 713/188 |

(Continued)

OTHER PUBLICATIONS

International Searh Report arid Written Opinion received in PCT Application No. PCT/US2009/061681, mailed on Jul. 27, 2010, pp. 10.

*Primary Examiner* — Meng An
*Assistant Examiner* — Benjamin Wu

(57) ABSTRACT

A method includes executing a hypervisor (165) with computing hardware (105) to implement a virtual machine (175); responsive to detecting a removable storage medium (115) communicatively coupled to the computing hardware (105), executing a virtualized migration control appliance (180) through the hypervisor (165) separate from the virtual machine (175); and blocking the virtual machine (175) from accessing data (185) stored by the removable storage medium (115) with the virtualized migration control appliance (180) if at least one governing policy prohibits the virtual machine (175) from accessing the data (185).

16 Claims, 5 Drawing Sheets

(56) References Cited

U.S. PATENT DOCUMENTS

| | | | |
|---|---|---|---|
| 2009/0049510 A1* | 2/2009 | Zhang et al. | 726/1 |
| 2009/0112867 A1* | 4/2009 | Roy et al. | 707/9 |
| 2009/0113128 A1 | 4/2009 | Zhao | |
| 2009/0210888 A1 | 8/2009 | Lee et al. | |
| 2010/0011358 A1* | 1/2010 | Kettler et al. | 718/1 |
| 2010/0031348 A1* | 2/2010 | Lam et al. | 726/19 |
| 2011/0153697 A1* | 6/2011 | Nickolov et al. | 707/827 |

* cited by examiner

DYNAMIC VIRTUALIZATION AND POLICY-BASED ACCESS CONTROL OF REMOVABLE STORAGE DEVICES IN A VIRTUALIZED ENVIRONMENT

BACKGROUND

Today's computers generally experience a substantial amount of interaction with external data (i.e., data not locally stored by the computers themselves). The adoption of universal protocols and device interfaces for communication with peripheral devices has led to the widespread use of removable data storage media, including optical disks and USB flash drives to transfer data to and from computer devices. Removable storage media have proven to be a particularly efficient and reliable way to transfer portable data to and from a computing device. In some situations, the use of a removable storage medium may even be a faster, more efficient, and/or more secure means of transferring data to and from a computer than a network connection.

Still, importing data onto a machine using a removable storage medium can be problematic. For example, corrupt files stored on the removable storage medium may cause an undesirable loss of data on the medium at best, and at worst can lead to the corruption of the host computer attempting to read to or write from the medium. Additionally, a removable storage medium infected with viruses, worms, spyware, and/or other malware may undesirably infect a host computer with the malware.

BRIEF DESCRIPTION OF THE DRAWINGS

The accompanying drawings illustrate various embodiments of the principles described herein and are a part of the specification. The illustrated embodiments are merely examples and do not limit the scope of the claims.

Throughout the drawings, identical reference numbers designate similar, but not necessarily identical, elements.

DETAILED DESCRIPTION

Figure 1:
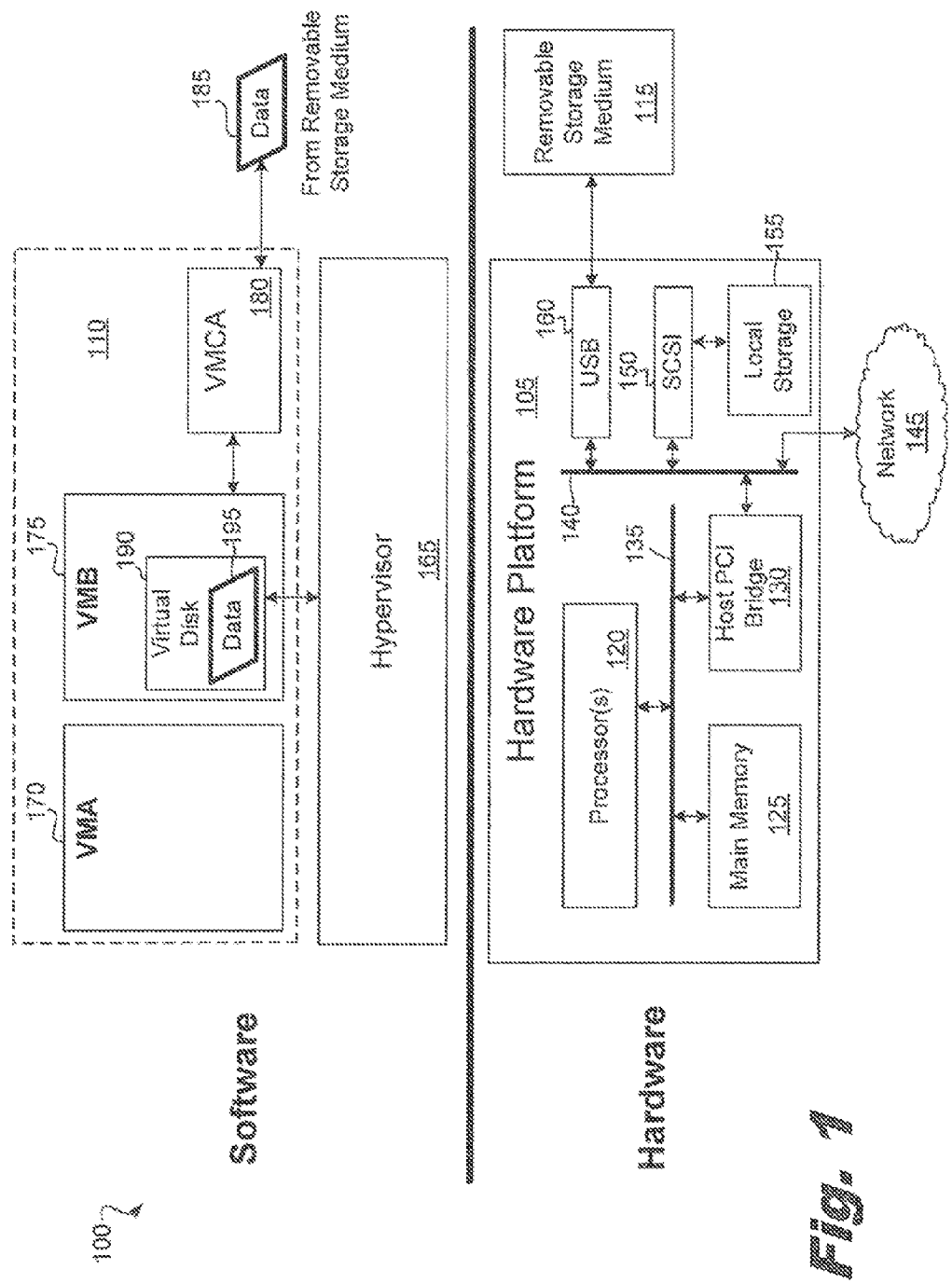
FIG. 1 is a block diagram of a computing system for the management of removable storage medium data in a virtual environment, according to one exemplary embodiment of the principles described herein.

As described above, importing data onto a machine using a removable storage medium can be problematic. Among other issues, corrupt data and malware can cripple a host computer attempting to communicate with the removable storage medium. In situations where a single hardware platform is used to implement a virtual environment having multiple virtual machines, the corruption or infection with malware of one virtual machine may adversely affect the remaining virtual machines, for example, by unnecessarily consuming system resources.

In light of these and other considerations, the present specification discloses methods, systems, and computer program products for managing removable storage medium data in a virtual environment. Specifically, the present specification discloses a virtual environment in which a hypervisor capable of implementing virtual machines and virtualized appliances is executed by a hardware platform. Upon detecting a removable storage medium communicatively coupled to the hardware platform, the hypervisor executes a virtualized migration control appliance that is separate from the virtual machine. The virtualized migration control appliance blocks the virtual machine from accessing data stored by the removable storage medium with the virtualized migration control appliance if at least one governing policy prohibits the virtual machine from accessing the data.

As used in the present specification and in the appended claims, the term "removable storage medium" refers to a physical apparatus configured to store data that may be selectively coupled to and decoupled from a host computing device such that the host computing device has access to the data stored by the apparatus when the apparatus is physically coupled to the host computing device. Examples of such removable storage media include, but are in no way limited to, USB flash drives, other USB storage devices, external hard drives, compact discs (CDs), digital video disks (DVDs), other removable optical media, floppy disks, other removable magnetic media, Bluetooth devices, and other close-range wireless devices. Permanent components of a computing device, regardless of whether such devices are removable, are expressly excluded from this group and are not "removable storage media" for the purposes of the present specification and the appended claims. Examples of such permanent components that are expressly excluded from "removable storage media" include, but are not limited to, permanent hard drives, system memory, and the like.

As used in the present specification and in the appended claims, the term "hypervisor" refers to a program that is executed directly by the underlying hardware of a computing device to implement one or more separate virtual machines and one or more virtualized appliances using the underlying hardware. For the purposes of the present specification and claims, the term "hypervisor" shall be viewed as synonymous to that of a "Virtual Machine Monitor" (VMM).

As used in the present specification and in the appended claims, the term "virtual machine" refers to a software implementation of a computing device that is configured to autonomously execute programs like a physical computing device.

As used in the present specification and in the appended claims, the term "virtualized migration control appliance" refers to a computer program for enforcing policies governing the migration of data between a virtual machine and a removable storage medium, the computer program being executed directly by a hypervisor, without an underlying operating system, and independent from any virtual machine implemented by the hypervisor.

As used in the present specification and in the appended claims, the term "virtual disk" or "virtual drive" refers to a software emulation of a physical disk drive that is treated like a physical disk drive by an operating system.

As used in the present specification and in the appended claims, the term "data washing" refers to the selective removal of private, privileged, or erroneous data from a collection of data in connection with a pending transfer of the collection of data.

As will be readily apparent to those having skill in the art, the present systems and methods may be implemented at least as a combination of hardware and software or as a computer program product in which computer readable code is stored on a tangible computer readable medium such that a computer may read the code thereon and thereby implement the functionality described herein. Such computer readable media may include, but are in no way limited to, random access memory (RAM), read only memory (ROM), flash memory, other nonvolatile and volatile electronic memory, magnetic storage media, optical storage media, and combinations thereof.

In the following description, for purposes of explanation, numerous specific details are set forth in order to provide a thorough understanding of the present systems and methods. It will be apparent, however, to one skilled in the art that the present systems and methods may be practiced without these specific details. Reference in the specification to "an embodiment," "an example" or similar language means that a particular feature, structure, or characteristic described in connection with the embodiment or example is included in at least that one embodiment, but not necessarily in other embodiments. The various instances of the phrase "in one embodiment" or similar phrases in various places in the specification are not necessarily all referring to the same embodiment.

The principles disclosed herein will now be discussed with respect to illustrative virtual environments.

Illustrative Virtual Environments

Referring now to FIG. 1, an illustrative computing system (100) is shown, in which an underlying hardware platform (105) executes software to create a virtual environment (110). As will be explained in more detail below, the virtual environment (110) of the computing system (100) is equipped to defend itself from corrupt, infected, or otherwise undesirable data that may be present on a removable storage medium (115).

The hardware platform (105) of the computing system (100) may include at least one processor (120) that executes code stored in the main memory (125). In certain embodiments, the processor (120) may be a multi-core processor having multiple independent central processing units (CPUs), with each CPU having its own L1 cache and all CPUs sharing a common bus interface and L2 cache. Alternatively, the processor (120) may be a single-core processor.

The at least one processor (120) may be communicatively coupled to the main memory (125) of the hardware platform and a host peripheral control interface bridge (PCI) (130) through a main bus (135). The main memory (125) may include dynamic non-volatile memory, such as random access memory (RAM). The main memory (125) may store executable code and data that obtainable by the processor (120) through the main bus (135).

The host PCI bridge (130) may act as an interface between the main bus (135) and a peripheral bus (140) used to communicate with peripheral devices. Among these peripheral devices may be a network interface configured to communicate with an external network (145), a Small Computer System Interface (SCSI) (150) for communicating with local storage devices (155), and a Universal Serial Bus (USB) interface (160) for communicating with external devices including, but not limited to, the removable storage medium (115).

It will be readily apparent to those having skill in the art that the present configuration of the hardware platform (105) is merely illustrative of one type of hardware platform (105) that may be used in connection with the principles described in the present specification. Moreover, it will be further apparent that various modifications, additions, and deletions to the hardware platform (105) shown are conceivable and anticipated by the present specification.

The hardware platform (105) shown in the lower half of the diagram of FIG. 1 is configured to implement the elements of software functionality shown in the upper half of the diagram of FIG. 1. Thus, as shown in FIG. 1, a hypervisor (165) program is executed directly by the hardware platform (105). The hypervisor (165) is configured to create the virtual environment (110) by implementing both virtual machines (170, 175) and virtualized appliances (180) through the managed utilization of the underlying processing and peripheral resources of the hardware platform (105).

Virtual machines (170, 175) may each autonomously run their own full-feature operating systems. By contrast, virtualized appliances (180) may run on a stripped down operating system implemented by the hypervisor (165) with just sufficient functionality to support the virtualized appliance (180). It should be understood that the hypervisor (165) may maintain several virtual machines (170, 175) and virtualized appliances (180) concurrently. For clarity, FIG. 1 shows the hypervisor (165) implementing two virtual machines (170, 175) and a single virtualized appliance (180)—the virtualized migration control appliance (180). It should be further understood that the virtual machines (170, 175) and virtualized appliances (180) are not mutually dependent; in other words, a virtualized appliance (180) may be executed and terminated without affecting the state of the virtual machines (170, 175) and vice versa.

To effect the transfer of data between a virtual machine (170, 175) and the removable storage medium (115), the presence of the removable storage medium (115) must first be detected and its data made available to the virtual machine (170,175) in question. The presence of the removable storage lo medium may be detected, for example, when the removable storage medium (115) is connected to a USB interface (160) specifically dedicated to the virtual machine (175).

Once a determination is made that the removable storage medium (115) has been connected to the hardware platform (105), the hypervisor (165) may launch the virtualized migration control appliance (180) configured to control the USB interface (160).

The hypervisor (165) may hide the USB interface (160) from the virtual machines (170, 175) such that the virtual machines (170,175) have no direct access to the USB interface (160) or, by extension, to the removable storage medium (115) itself. Thus, all direct interactions between the removable storage medium (115) and the hardware platform (105) must be controlled by the virtualized migration control appliance (180), and not delegated to the operating systems of the virtual machines (170, 175). Accordingly, the virtualized migration control appliance (180) is the final and sole authority on data transfer between the removable storage medium (115) and the virtual machines (170, 175).

The virtualized migration control appliance (180) is configured to perform relevant tests on the removable storage medium (115) to determine whether the data stored by the removable storage medium (115) complies with one or more policies that must be satisfied before the data of the removable storage medium (115) can be made available to the virtual machines (170, 175). Once these tests have been met, the data (185) of the removable storage medium (115) may be made available to one or more of the virtual machines (170, 175) as a virtual disk (190) within the operating system of the virtual machine(s) in question, the virtual disk (190) having data (195) mapped to the data (185) of the removable storage medium (115) according to principles known in the art.

In certain embodiments, as will be explained in more detail below, the virtualized migration control appliance (180) may be configured to perform certain actions on the data (185) stored by the removable storage medium (115) to bring the data (185) into compliance with the one or more policies it implements prior to granting one or more of the virtual machines (170, 175) access to the data. These corrective actions may include, but are not limited to, decrypting the data (185), removing known malware from the data (185), performing a data washing operation on the data (185), and the like.

In certain embodiments, the hypervisor (165) and/or virtualized migration control appliance (180) may determine a specific virtual machine (175) or subset of the virtual machines (170, 175) to which the data of the removable storage medium (115) is to be made available and create the aforementioned virtual disk (190) only for that particular virtual machine (175). Such an embodiment is shown in FIG. 1, in which only virtual machine VMB (175) has access to the data (185) from the removable storage medium (115) through its virtual disk (190). The determination of the correct virtual machine (175) to receive access the data (185) from the removable storage medium (115) may be made, for example, the use of dedicated hardware, an indication made by a user, and/or an indication from an operating system of the virtual machine(s) (170, 175) in question.

In alternative embodiments, the data (185) from the removable storage medium (115) may be made available to each virtual machine (170, 175) implemented by the hypervisor (165) once the virtualized migration control appliance (180) has determined that the data (185) complies with the policies necessary to grant such access.

In still other embodiments, a determination of which virtual machines (170, 175) receive access to the data (185) from the removable storage medium (115) may be made according to the policies enforced by the virtualized migration control appliance (180). For example, if the virtual migration control appliance (180) determines that the data (185) on the removable storage medium complies with certain policies necessary to provide virtual machine VMB (175) access to the data (185) but that the data (185) does not comply with policies necessary to provide virtual machine VMA (170) access to the data (185), only the operating system of virtual machine VMB (175) will be provided with the virtual disk (190) granting access to the data (185).

The virtualized migration control appliance (180) may also regulate the writing of data to the removable storage medium (115) by a virtual machine (170, 175). Particularly, the virtualized migration control appliance (180) may intercept data from the virtual machine (170, 175) intended for the removable storage medium (115) and ensure that the data complies with certain policies prior to permitting the data to be written to the removable storage medium (115).

In certain embodiments, the virtualized migration control appliance (180) may perform one or more corrective actions on data intended to be written to the removable storage medium (115) to bring the data into compliance with one or more applicable policies prior to allowing the data to be written to the removable storage medium (115). These corrective steps include, but are not limited to, encrypting the data, signing the data, removing known malware from the data, and the like The virtualized migration control appliance (180) may restart after every use. This feature coupled with the fact that virtualized migration control appliance (180) may have no memory allocated to it may render neutral any attacks against the virtualized migration control appliance.

Figure 2:
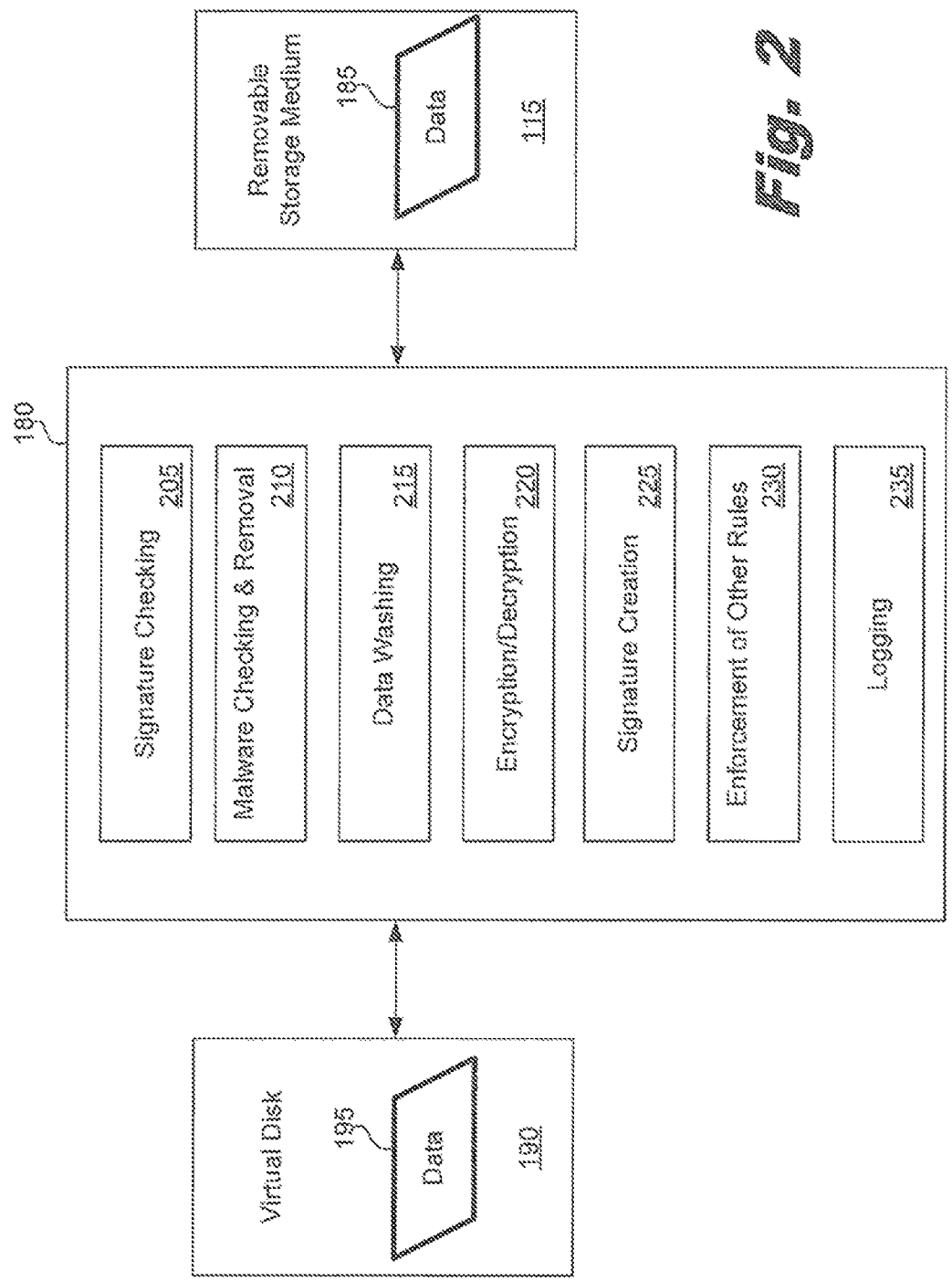
FIG. 2 is a block diagram of an illustrative interaction between a removable storage medium and a virtual disk of a virtual machine, as facilitated by an illustrative virtualized migration control appliance, according to one exemplary embodiment of the principles described herein.

Referring now to FIG. 2, an illustrative interaction between a removable storage medium (115) and a virtual disk (190) of a virtual machine (175, FIG. 1) are shown, consistent with the principles described above in relation to FIG. 1. The virtual disk (190) may be present in the operating system of a virtual machine (175, FIG. 1) which the virtualized migration control appliance (180) has permitted to access the data (185) stored by the removable storage medium. This data (185) appears to the operating system of the virtual machine (175, FIG. 1) simply as data (195) stored by the virtual disk (190). Thus, when the operating system reads data (195) from the virtual disk (190), it receives the corresponding data (185) stored by the removable storage medium (115). Similarly, when the operating system of the virtual machine (175, FIG. 1) writes data to the virtual disk (190), that data is written to the removable storage medium (115).

The virtualized migration control appliance (180) may be disposed logically between the virtual disk (190) of the virtual machine (175, FIG. 1) and the removable storage medium (115). As described above, the virtualized migration control appliance (180) may oversee and supervise the transfer of data between the virtual machine (175, FIG. 1) and the removable storage medium (115) to ensure that the data transferred complies with policies. In the event that a data transfer does not comply with policy and cannot be made to comply with policy, the virtualized migration control appliance (180) will block the data transfer.

To enable the virtualized migration control appliance (180) to perform this task, the virtualized migration control appliance (180) may be equipped to perform various processes with respect to the data being transferred between the virtual disk (190) of the virtual machine (175, FIG. 1) and the removable storage medium (115). Examples of such processes are illustrated in FIG. 2 as functional modules (205, 210, 215, 220, 225, 230, and 235) implemented by the virtualized migration control appliance (180). It will be readily apparent to those skilled in the art that the virtualized migration control appliance (180) may be configured to implement additional or different functional modules from those shown in FIG. 2 depending on the specific policies enforced by the virtualized migration control appliance (180).

The functional modules implemented by the virtualized migration control appliance of the present example include a signature checking module (205) for checking digital signatures affixed to data being transferred between the removable storage medium and the virtual machine (175, FIG. 1). In certain embodiments, the type or validity of the digital signature affixed to data being transferred may determine which policies are applied to the data and/or how strictly the policies will be enforced against the data. For example, data signed by a friendly Trust Domain may be imported to the virtual machine (175, FIG. 1) with little or no checking while data without a signature or with a signature from an untrusted domain may be subject to the enforcement of more policies.

A malware checking module (210) may check incoming and outgoing data for known viruses, spyware, worms, Trojan horses, or other known malware and remove any found malware where possible. Where disinfection of the data being transferred is not possible, the virtualized migration control appliance will likely block the data transfer entirely.

A data washing module (215) may be configured to remove personal, confidential, or otherwise privileged or undesirable information from data being transferred. In certain embodiments, the data washing module (215) may be configured to remove metadata from documents subject to the data transfer.

An encryption/decryption module (220) may encrypt data being written to the removable storage medium (115) and decrypt data being read from the removable storage medium (115) where applicable or dictated by policy. In certain embodiments, the data being transferred may employ identity-based encryption (IBE) or a similar method of encrypting the data based on conditions set by an author of the data. For example, the author may specify that the data may only be decrypted by a particular recipient and/or to be usable within a particular time/environment. In such embodiments, the encryption/decryption module (220) may be configured to ensure that all necessary conditions are met before decrypting data stored on the removable storage medium (115). Moreover, the encryption/decryption module (220) may additionally or alternatively be configured to receive IBE parameters from an author of data and encrypt the data to be stored on the removable data storage medium (115) in accordance with those parameters.

A signature creation module (225) may affix a digital signature to data being written to the removable storage medium (115) such that the digital signature indicates the source of the data being stored.

Additionally, one or more modules (230) may be configured to enforce one or more other rules according to the specific policies implemented in an appliance of the principles described herein. For example, in certain embodiments a source may negotiate with a controlling authority to be able to transmit data to a recipient. Only when the source has permission from the controlling authority can the data be sent to, and received by, the recipient. The virtualized migration control appliance may be configured to enforce such rules, when applicable, before allowing a data transfer between the removable data storage medium (115) and the virtual disk (190) of the virtual machine (175, FIG. 1) to occur. Moreover, the virtualized migration control appliance (180) may be configured to enforce any other rule that may suit the policies chosen for a particular appliance of the principles described herein.

The virtualized migration control appliance (180) may also include a logging module (235) to make records of attempted data transfers between the virtual disk (190) of the virtual machine (175, FIG. 1) and the removable storage medium (115). The records may include, but is not limited to, information about the data transfer attempts including the date, time, source, recipient, policies applied, and success/failure of the data transfer. Since the virtualized migration control appliance (180) may not have storage allocated to it for security purposes, the virtualized migration control appliance (180) may report the logging data to, for example, the hypervisor (165) or a controlling virtual machine (170, 175) such that an administrator can access the logging information and make adjustments to policy and/or identify attempted security breaches.

Illustrative Methods

Figure 3:
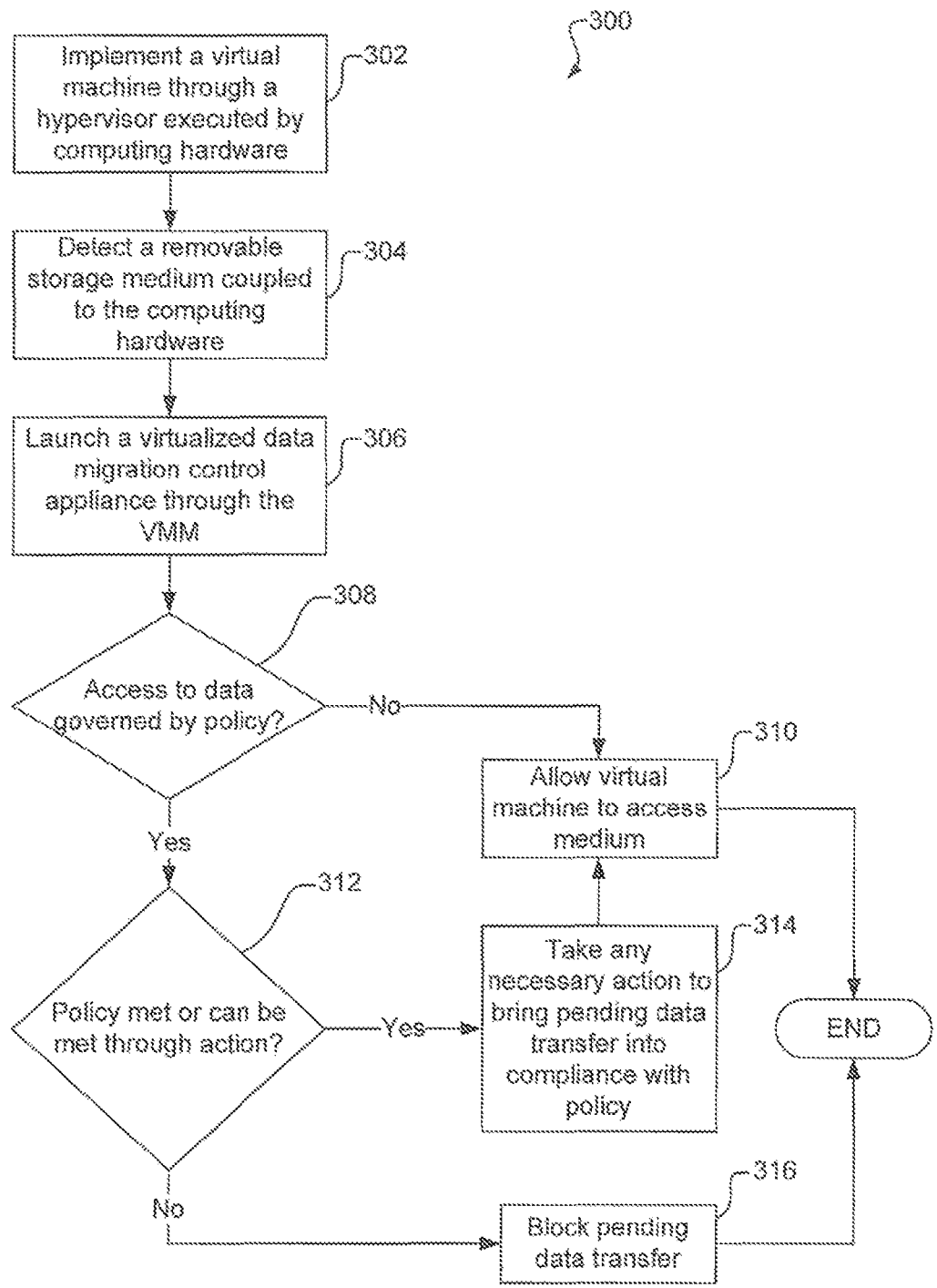
FIG. 3 is a flow diagram of an illustrative method of managing removable storage medium data in a virtual environment, according to one exemplary embodiment of the principles described herein.

Referring now to FIG. 3, a flow chart is shown of an illustrative method (300) of managing removable storage medium data in a virtual environment. The method (300) may be implemented by, for example, a hardware platform (105, FIG. 1) of a computing system (100, FIG. 1) configured to implement a virtual environment (110, FIG. 1). In the method (300), a virtual machine is implemented (step 302) through a hypervisor executed by system hardware. After detecting (step 304) a removable storage medium coupled to the computing hardware, a virtualized data migration control appliance is launched (step 306) through the hypervisor. The remaining blocks (308, 310, 312, 314, 316) illustrated in FIG. 3 may be executed by the virtualized data migration control appliance.

A determination is made (decision 308) as to whether access to the data stored on the removable storage medium by the virtual machine is governed by policy. If no policy governs access (decision 308, No), the virtual machine is allowed (step 310) to access the data on the removable storage medium through a virtual disk as described above.

If, on the other hand, a policy governs (decision 308, Yes) whether the virtual machine can access the data stored by the removable storage medium, a determination is made (decision 312) as to whether the policy has already been met or action can be taken to meet the policy. If so (decision 312, Yes), any necessary action is taken (step 314) by the virtualized migration control appliance to meet the requirements of the policy and the virtual machine is allowed (step 310) to access the data on the removable storage medium through a virtual disk. If the policy is not met and no action can be taken to remedy the failure to meet the policy (decision 312, No), the virtual machine is blocked (step 316) from accessing the data stored by the removable storage medium.

Figure 4:
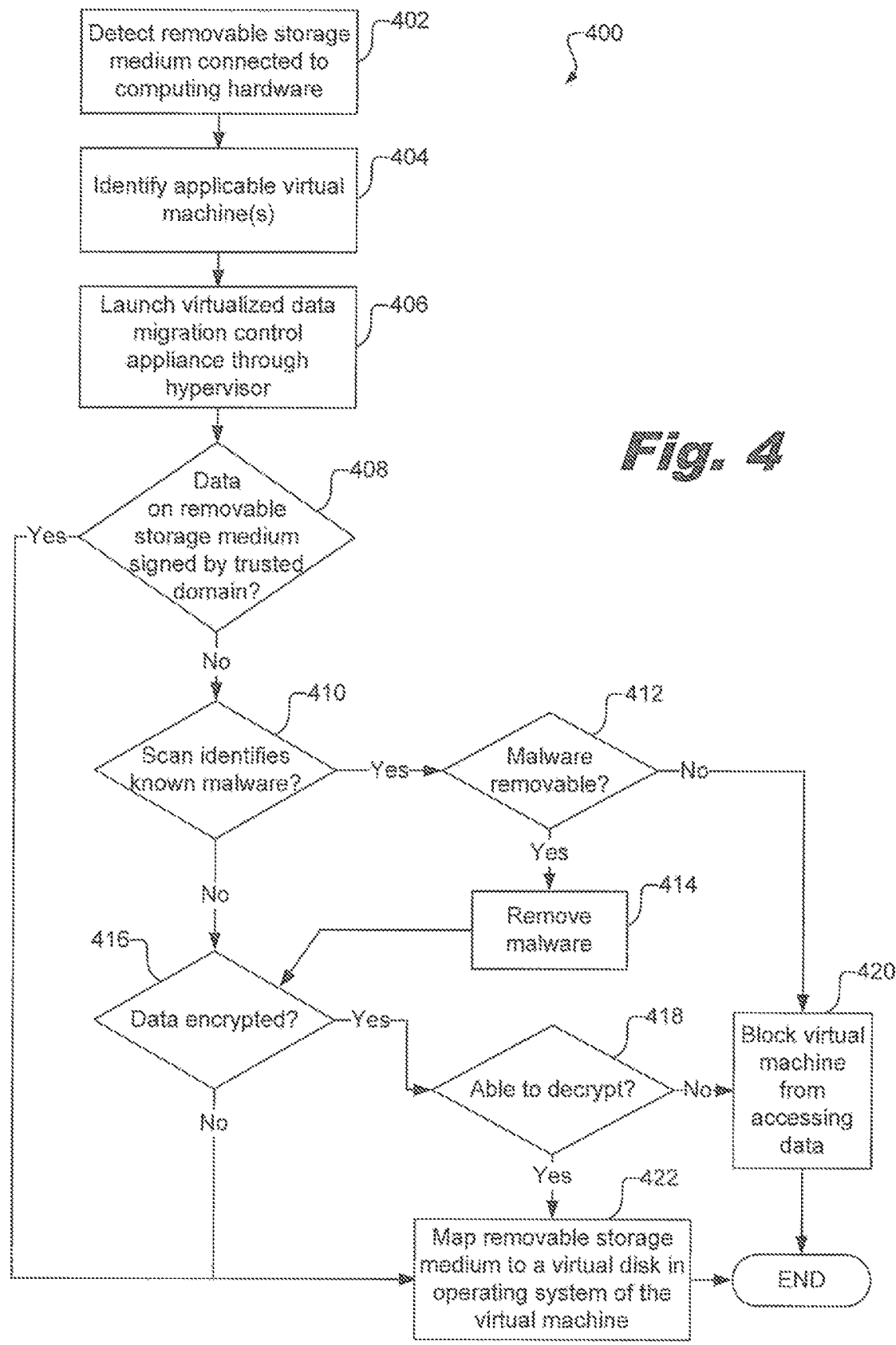
FIG. 4 is a flow diagram of an illustrative method of reading data from a removable storage medium to a virtual machine, according to one exemplary embodiment of the principles described herein.

Referring now to FIG. 4, a flowchart is shown of an illustrative method (400) of reading data from a removable storage medium to a virtual machine consistent with the general principles described above in relation to FIG. 3. In the present example, the virtualized migration control appliance is configured enforce three policies related to reading data from the removable storage medium. The exemplary policies are as follows: 1) Any virtual machine is automatically authorized to access data signed by a trusted domain; 2) No virtual machine is authorized to access data infected with malware; and 3) Encrypted data on the removable storage device must be unencrypted prior to access by the virtual machine.

Turning now to the illustrative method 400, after a removable storage medium connected to computing hardware is detected (step 402), the virtual machine(s) to which the removable storage medium pertains is identified (step 404). The virtual machine(s) are implemented by a hypervisor, which also launches (step 406) a new instance of a virtualized data migration control appliance for interacting with the removable storage medium.

A determination is then made (decision 408) by the virtualized migration control appliance as to whether the data on the removable storage medium has been signed by a trusted domain. If so (decision 408, Yes), the removable storage medium is mapped to a virtual disk in the operating system of the virtual machine, consistent with Policy 1 above. Otherwise (decision 408, No), a determination is made (decision 410) as to whether a scan of the data stored by the removable storage medium identifies known malware. If malware is identified (decision 410, Yes) and unable to be removed, the virtual machine is blocked (step 420) from accessing the data on the removable storage medium consistent with Policy #2.

If identified malware is removed (decision 412 and step 414) or if no known malware is identified in the scan (decision 410, No), a determination is then made (decision 416) by the virtualized migration control appliance as to whether the data stored by the removable storage medium is encrypted. If the data is unencrypted or if the data is encrypted (decision 416, Yes) and the virtualized migration control appliance is able to decrypt the data (decision 418, Yes), then the removable storage medium is mapped (step 422) to a virtual disk in the operating system of the virtual machine. Otherwise, the virtual machine will be blocked (step 420) from accessing the data on the removable storage medium consistent with Policy #3.

Figure 5:
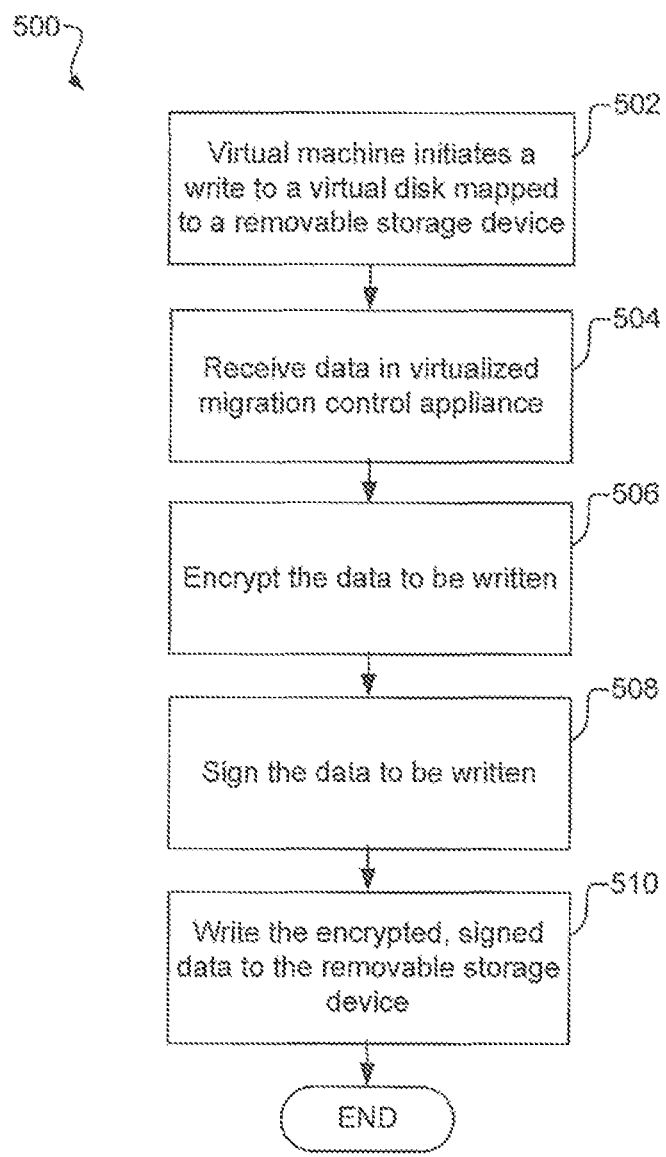
FIG. 5 is a flow diagram of an illustrative method of writing data from a virtual machine to a removable storage medium, according to one exemplary embodiment of the principles described herein.

Referring now to FIG. 5, a flowchart is shown of an illustrative method (500) of writing data to a removable storage medium from a virtual machine consistent with the general principles described above in relation to FIG. 3. In the present example, the virtualized migration control appliance is configured to enforce two policies: 1) Data must be encrypted prior to storage on the removable storage device; 2) Data must be digitally signed prior to storage on the removable storage device.

The method (500) of writing to the removable storage device resulting from these two policies is fairly straightforward. First, a virtual machine initiates (step 502) a write to a virtual disk mapped to the removable storage device. The data to be written to the removable storage device is received (step 504) by a virtualized migration control appliance consistent with the general principles described above. The data is encrypted (step 506) and then signed (step 508) by the virtualized migration control appliance, which thereafter writes (step 510) the encrypted, signed data to the removable storage device.

In sum, the present specification discloses methods, systems, and computer program products through which any number of guest operating systems can be run in any number of virtual machines implemented by a hardware platform. The principles of the present specification advantageously ensure that data imported to or exported from any of the guest operating machines must go through a controlled and well-defined path and be subject to specified policy controls, irrespective of its particular guest operating system, the state of its guest operating system, and the applications being run by its guest operating system.

The preceding description has been presented only to illustrate and describe embodiments and examples of the principles described. This description is not intended to be exhaustive or to limit these principles to any precise form disclosed. Many modifications and variations are possible in light of the above teaching.

What is claimed is:

1. A method of virtualized migration control comprising:
   executing a hypervisor with computing hardware to implement a virtual machine;
   responsive to detecting a removable storage medium communicatively coupled to said computing hardware, executing, through said hypervisor, an instance of a virtualized migration control appliance separate from said virtual machine;
   blocking said virtual machine from accessing data stored on said removable storage medium with said instance of said virtualized migration control appliance if at least one governing policy prohibits said virtual machine from accessing said data;
   executing a separate instance of said virtualized migration control appliance for each of at least one other removable storage medium communicatively coupled to said computing hardware; and
   responsive to determining that a communicatively coupled removable storage medium has been disconnected from said computing hardware, terminating, through said hypervisor, said instance of said virtualized migration control appliance corresponding to said disconnected removable storage medium.

2. The method of claim 1, further comprising making a hardware interface to said removable storage medium invisible to an operating system of said virtual machine.

3. The method of claim 1, further comprising: responsive to a determination that no governing policy prohibits said virtual machine from accessing said data stored on said removable storage medium, allowing said virtual machine to access said data stored on said removable storage medium through a virtual disk implemented in an operating system of said virtual machine, said virtual disk being mapped to said removable storage medium through said instance of said virtualized migration control appliance.

4. The method of claim 1, further comprising satisfying said at least one governing policy by performing with said instance of said virtualized migration control appliance at least one corrective action on data to be read from or written to said removable storage medium.

5. The method of claim 4, in which said at least one governing policy prohibits said virtual machine from accessing said removable storage medium if malware is detected on said removable storage medium, and said at least one corrective action comprises removing said detected malware.

6. The method of claim 4, in which said at least one corrective action comprises performing a data washing procedure on said data to be read from or written to said removable storage medium.

7. The method of claim 1, in which said at least one governing policy is at least partially based on a signature associated with data stored on said removable storage medium.

8. The method of claim 1, in which said at least one governing policy is at least partially based on conditions set by an author of data to be read from or written to said removable storage medium.

9. The method of claim 1, further comprising: encrypting data to be written from said virtual machine to said removable storage medium; and decrypting data to be read from said removable storage medium by said virtual machine; in which said encrypting and decrypting is performed by said virtualized data migration control appliance.

10. The method of claim 1, wherein said virtualized migration control appliance comprises a program executed by said hypervisor for enforcing policies governing the migration of data between said virtual machine and said removable storage medium without an underlying operating system and independent from any virtual machine implemented by said hypervisor.

11. A computing system comprising:
    a processor coupled to computer readable memory; and
    at least one removable storage medium hardware interface communicatively coupled to said processor;
    in which said processor is configured to:
      execute a hypervisor to implement a virtual machine; and
      responsive to detecting a removable storage medium communicatively coupled to said at least one removable storage medium hardware interface, execute, through said hypervisor, an instance of a virtualized migration control appliance separate from said virtual machine, said instance of said virtualized data migration control appliance being configured to block said virtual machine from accessing data stored on said removable storage medium if at least one governing policy prohibits said virtual machine from accessing said data;

execute a separate instance of said virtualized migration control appliance for each of at least one other removable storage medium communicatively coupled to said at least one removable storage medium hardware interface; and responsive to determining that a communicatively coupled removable storage medium has been disconnected from said at least one removable storage medium hardware interface, terminate, through said hypervisor, said instance of said virtualized migration control appliance corresponding to said disconnected removable storage medium.

12. The computing system of claim 11, in which said at least one removable storage hardware device interface is invisible to an operating system of said virtual machine.

13. The computing system of claim 11, in which said instance of said virtualized migration control appliance is configured to allow said virtual machine to access said data stored on said removable storage medium through a virtual disk implemented in an operating system of said virtual machine, said virtual disk being mapped to said removable storage medium through said instance of said virtualized migration control appliance.

14. The computing system of claim 11, wherein said virtualized migration control appliance comprises a program executed by said hypervisor for enforcing policies governing the migration of data between said virtual machine and said removable storage medium without an underlying operating system and independent from any virtual machine implemented by said hypervisor.

15. A computer program product comprising:

a non-transitory computer readable storage medium comprising computer executable code, said computer executable code comprising:

computer executable code configured to execute a hypervisor to implement a virtual machine on computing hardware;

computer executable code configured to, responsive to detecting a removable storage medium communicatively coupled to said computing hardware, execute, through said hypervisor, an instance of a virtualized data migration control appliance separate from said virtual machine, in which said instance of said virtualized data migration control appliance is configured to block said virtual machine from accessing data stored on said removable storage medium if at least one governing policy prohibits said virtual machine from accessing said data;

computer executable code configured to execute a separate instance of said virtualized migration control appliance for each of at least one other removable storage medium communicatively coupled to said computing hardware; and computer executable code configured to, responsive to determining that a communicatively coupled removable storage medium has been disconnected from said computing hardware, terminate, through said hypervisor, said instance of said virtualized migration control appliance corresponding to said disconnected removable storage medium.

16. The computer program product of claim 15, wherein said virtualized migration control appliance comprises a program executed by said hypervisor for enforcing policies governing the migration of data between said virtual machine and said removable storage medium without an underlying operating system and independent from any virtual machine implemented by said hypervisor.

\* \* \* \* \*